(12) United States Patent
Fukasawa et al.

(10) Patent No.: US 7,685,900 B2
(45) Date of Patent: Mar. 30, 2010

(54) VEHICLE MOUNTED WITH CONTINUOUS STEPLESS TRANSMISSION

(75) Inventors: Toshihiko Fukasawa, Komatsu (JP); Eiji Ishibashi, Komatsu (JP); Ikuzo Mochida, Komatsu (JP); Hidehiro Hashimoto, Komatsu (JP); Masato Oura, Komatsu (JP)

(73) Assignee: Komatsu Ltd., Tokyo (JP)

( * ) Notice: Subject to any disclaimer, the term of this patent is extended or adjusted under 35 U.S.C. 154(b) by 709 days.

(21) Appl. No.: 10/581,630

(22) PCT Filed: Dec. 3, 2004

(86) PCT No.: PCT/JP2004/018017

§ 371 (c)(1),
(2), (4) Date: Nov. 17, 2006

(87) PCT Pub. No.: WO2005/054720

PCT Pub. Date: Jun. 16, 2005

(65) Prior Publication Data

US 2007/0111851 A1    May 17, 2007

(30) Foreign Application Priority Data

Dec. 4, 2003    (JP)    ............................ 2003-405401

(51) Int. Cl.
  *F16H 59/00* (2006.01)
(52) U.S. Cl. ........................... 74/335; 477/38; 74/730.1
(58) Field of Classification Search .................. 477/37, 477/38, 52; 475/76, 80, 91; 74/730.1, 731.1, 74/335

See application file for complete search history.

(56) References Cited

U.S. PATENT DOCUMENTS 5,609,544 A    3/1997    Lardy et al.

(Continued)

FOREIGN PATENT DOCUMENTS

CN    1342567 A    4/2002

(Continued)

OTHER PUBLICATIONS

International Preliminary Report on Patentability, Chapter I of the Patent Cooperation Treaty, and Written Opinion of the International Searching Authority, for PCT/JP2004/018017, 4 sheets.

(Continued)

*Primary Examiner*—David D Le
(74) *Attorney, Agent, or Firm*—Frishauf, Holtz, Goodman & Chick, P.C.

(57) ABSTRACT

A vehicle mounted with a continuous stepless transmission having a continuous stepless transmission and a controlling section for performing speed-changing operation of the continuous stepless transmission, the speed change ratio of the continuous stepless transmission being switchable by a speed change operation section, includes: a shift-mode-switching section which switches the mode of a speed change ratio switching, the speed change ratio switching being performed by the speed change operation section, between a first mode for switching the speed change ratio in stages among a plurality of preset speed change ratios and a second mode for switching the speed change ratio continuously or substantially continuously; in which the controlling section further includes a vehicle speed setting section which sets a target vehicle speed at least based on the speed change operation signal detected by operating the speed change operation section and a mode signal detected by switching the shift-mode-switching section.

5 Claims, 7 Drawing Sheets

U.S. PATENT DOCUMENTS

| | | | |
|---|---|---|---|
| 5,823,052 A * | 10/1998 | Nobumoto | 74/335 |
| 6,381,529 B1 | 4/2002 | Mistry | |
| 6,470,771 B2 * | 10/2002 | Nanri et al. | 74/733.1 |
| 6,631,352 B1 | 10/2003 | Fujita et al. | |
| 7,037,236 B2 * | 5/2006 | Ishibashi et al. | 477/52 |
| 2001/0036881 A1 | 11/2001 | Nanri et al. | |
| 2002/0027031 A1 | 3/2002 | Miyata | |

FOREIGN PATENT DOCUMENTS

| | | |
|---|---|---|
| EP | 0 713 985 A2 | 5/1996 |
| EP | 1 265 010 A2 | 12/2002 |
| JP | 62-238130 A | 10/1987 |
| JP | 2000-118255 A | 4/2000 |
| JP | 3352041 B2 | 9/2002 |

OTHER PUBLICATIONS

Chinese Office Action (and partial English translation thereof) dated May 9, 2008, issued in a counterpart Chinese Application.

* cited by examiner

VEHICLE MOUNTED WITH CONTINUOUS STEPLESS TRANSMISSION

This application is a U.S. National Phase Application under 35 USC 371 of International Application PCT/JP2004/018017 filed Dec. 3, 2004.

TECHNICAL FIELD

The present invention relates to a vehicle mounted with a continuous stepless transmission.

BACKGROUND ART

There has conventionally been known a working vehicle capable of traveling by a hydrostatic driving mechanism (hereinafter referred to as "HST"), the working vehicle being a vehicle mounted with a continuous stepless transmission including a variable capacity hydraulic pump driven by an engine and a variable capacity hydraulic motor rotated by means of pressured oil received from the variable capacity hydraulic pump, in which the speed of the working vehicle can be steplessly changed by changing the angle of a swash plate of either the variable capacity hydraulic pump or the variable capacity hydraulic motor.

Further, there has been an example of a speed changing device for a bulldozer as a working vehicle, which is, however, not a vehicle mounted with an HST, in which an operation grip of a mono-lever is provided with a speed-stage-switching switch for shifting up or shifting down the speed stage of a transmission. Either a shift-up operation signal or a shift-down operation signal output by the speed-stage-switching switch is input to a controller, and the speed can be changed to a second speed or a third speed by performing the shift-up operation with the speed-stage-switching switch (refer to, for example, Patent Document 1).

The speed changing device of mono-lever type may be applied to a bulldozer mounted with an HST. In other words, the configuration may be the one in which the bulldozer is enabled to travel by an HST, a controller for speed change is provided, and the tilting angle of the swash plate of either the variable capacity hydraulic pump or the variable capacity hydraulic motor is allowed to be continuously changed by operating the speed-stage-switching switch.

With the above configuration, when the speed-stage-switching switch provided on the operation grip of the mono-lever is pushed once, the angle of the swash plate is changed by one stage, which corresponds to a predetermined small angle, and the angle of the swash plate can be substantially continuously changed stage by stage by continuously pushing the speed-stage-switching switch once by once. The operator pushes the speed-stage-switching switch for a few times until the speed change ratio suitable to a desired vehicle speed is reached. Also, the speed change ratio can change fractionally and substantially continuously stage by stage if the speed-stage-switching switch is continuously pushed until the desired vehicle speed is reached, so that the substantially stepless speed change utilizing the features of HST can be achieved.

[Patent Document 1] Japanese Patent Publication No. 3,352,041 (Pages 4 to 5 and FIG. 3)

DISCLOSURE OF THE INVENTION

Problems to be Solved by the Invention

As described above, by performing the speed change substantially steplessly with the speed-stage-switching switch, though it is possible to select fractional speed change ratio, in the case where the speed change ratio needs to be greatly changed, the speed-stage-switching switch has to be pushed for many times, or the speed-stage-switching switch has to be continuously pushed, so that it takes long time to perform speed change.

Particularly, to many operators who are used to operating a vehicle mounted with a transmission in which the speed change is performed by gear shift (i.e. a stepped transmission), rapid speed change similar to that of a stepped transmission is more required than the fractional stepless speed change.

In view of the foregoing, it is an object of the present invention to provide a vehicle mounted with a continuous stepless transmission which can not only perform fractional stepless speed change utilizing the features of HST, but also can perform rapid speed change.

Means for Solving the Problems

The vehicle mounted with a continuous stepless transmission according to a first aspect of the present invention includes a continuous stepless transmission, a controlling section for performing speed-changing operation of the continuous stepless transmission, a speed change operation section adapted to switch a speed change ratio of the continuous stepless transmission, and a shift-mode-switching section which switches a mode of a speed change ratio switching between a first mode for switching the speed change ratio in stages among a plurality of preset speed change ratios and a second mode for switching the speed change ratio continuously or substantially continuously, in which the controlling section includes a vehicle speed setting section which sets a target vehicle speed at least based on a speed change operation signal detected by operating the speed change operation section and a mode signal detected by switching the shift-mode-switching section.

The vehicle mounted with a continuous stepless transmission according to a second aspect of the present invention is characterized in that in the first aspect of the present invention, the continuous stepless transmission is an HST.

Herein, the HST of either an opened circuit type or a close circuit type can apply the present invention.

The vehicle mounted with a continuous stepless transmission according to a third aspect of the present invention is characterized in that in the first aspect or the second aspect of the present invention, the speed change operation section in the first mode and the speed change operation section in the second mode are the same.

The vehicle mounted with a continuous stepless transmission according to a fourth aspect of the present invention is characterized in that in any one of the first aspect to the third aspect of the present invention, the vehicle is a construction machine, and the speed change operation section is a push-button switch arranged on a traveling lever of the construction machine.

EFFECT OF THE INVENTION

According to the first aspect or the second aspect of the present invention, the operator can freely set the speed change mode between the stepped speed change mode and the continuous speed change mode with the shift-mode-switching section, a control signal generating section generates a speed changing control signal based on a judgment result of a shift mode judging part of the controlling section, and a control signal output section outputs the speed changing control signal to the continuous stepless transmission. Therefore the operator can not only rapidly perform the speed change but also can fractionally adjust the speed change ratio.

According to the third aspect of the present invention, since the speed change can be performed by using the same speed change operation section even when the shift mode is switched, the operator is prevented from being bewildered when performing the speed change operation.

According to the fourth aspect of the present invention, since the speed change operation can be performed without a need to release hand from the travel lever, the fatigue of an operator is reduced even at a construction machine having frequent impact and vibration.

EXPLANATION OF CODES

7 . . . HST device (continuous stepless transmission), 67 . . . shift-mode-switching switch (shift-mode-switching section), 74 . . . controller (controlling section), 641 . . . shift-up switch (speed change operation section), 642 . . . shift-down switch (speed change operation section), 742 . . . vehicle speed setting section

BEST MODE FOR CARRYING OUT THE INVENTION

Preferred embodiment of a vehicle mounted with a continuous stepless transmission of the present invention is described below referring to the accompanying drawings

[1] Entire Configuration

Figure 1:
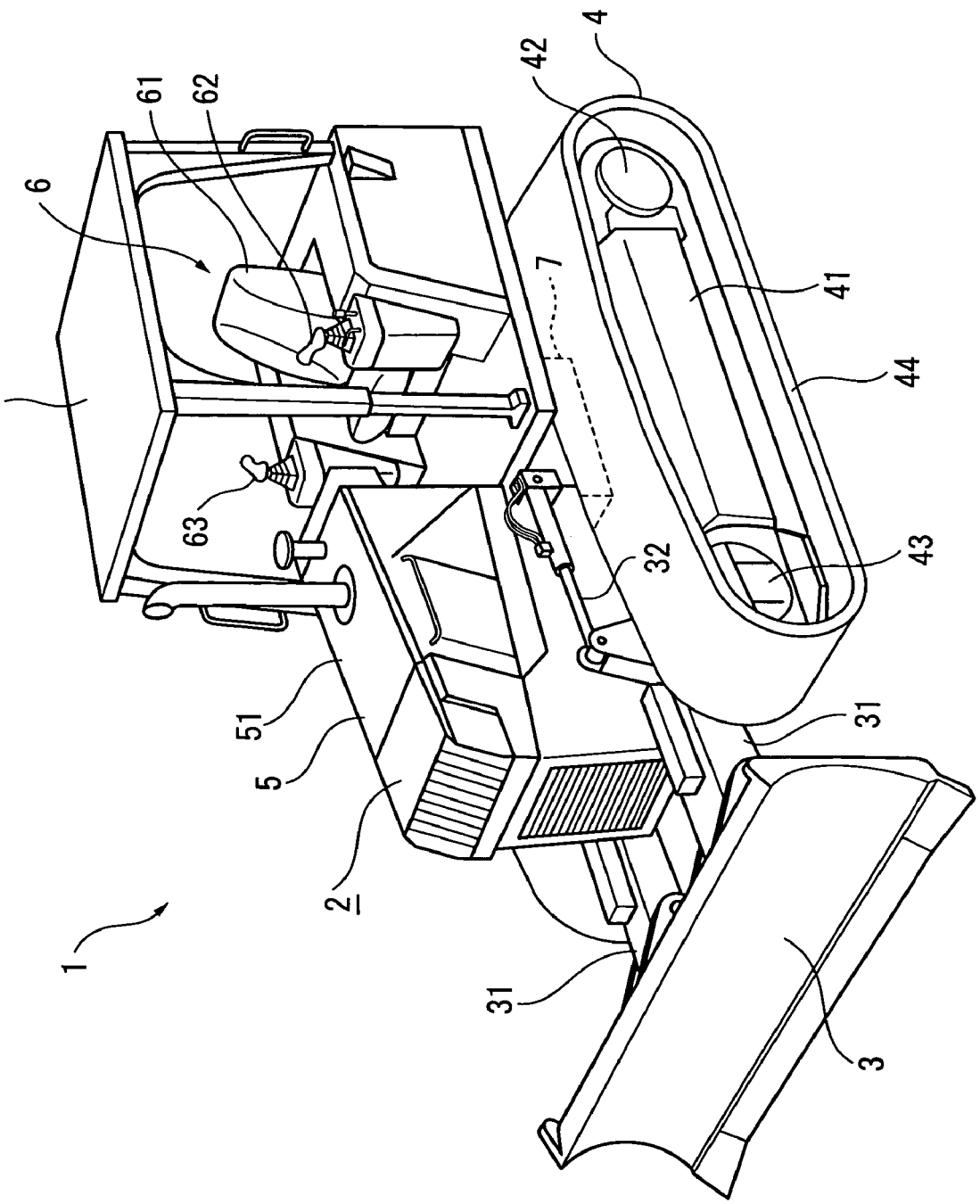
FIG. 1 is a brief perspective view showing a construction machine in an embodiment of the present invention.

FIG. 1 shows a bulldozer 1 in an embodiment of the present invention. The bulldozer 1 includes a vehicle body 2, a bulldozing blade 3, and a crawler device 4.

The bulldozing blade 3 is arranged at the front end of the bulldozer 1 and is adapted for banking work and ground leveling work. The bulldozing blade 3 is connected to the vehicle body 2 via a frame 31, and is vertically moved by the expansion/contraction of a cylinder 32.

The crawler device 4 is arranged on both sides under the vehicle body 2 and serves as a traveling device. The crawler device 4 includes a track frame 41, a driving wheel 42, an idler 43, and a crawler 44.

The track frame 41 is a steel-made structure extending along the vehicle body 2 and is swingably pivotally supported on a pivot shaft protruding from a mainframe of the vehicle body 2.

The sprocket-like driving wheel 42 is a section driven by the below-mentioned hydraulic motor as a driving source and is sprocket-shaped. The crawler 44 is wound so as to be engaged with the sprocket portion.

The idler 43 is a wheel on the other end wound by the crawler 44. When the crawler 44 is moved by the driving wheel 42, the idler 43 rotates due to the movement of the crawler 44. Incidentally, though not shown in FIG. 1, a plurality of lower rolling wheels are arranged in the lower part of the track frame 41. The lower rolling wheels not only support the load received by the crawler 44 from the ground, but also serve as guide rollers when the driving wheel 42 is driving.

The vehicle body 2 is mounted on a mainframe (not shown) and has an engine 5 arranged on the front side of the travelling direction thereof, and an operation room 6 arranged on the rear side of the travelling direction thereof. The engine 5 has an engine body housed in an engine hood 51. The engine 5 is a power source for driving an HST pump constituting an HST device 7 arranged under the vehicle body 2.

The operation room 6 is the room where the operator operates the bulldozer 1. The operation room 6 has a driver's seat 61, operation levers 62 and 63. The upper portion of the operation room 6 is covered with a canopy 8.

Figure 2:
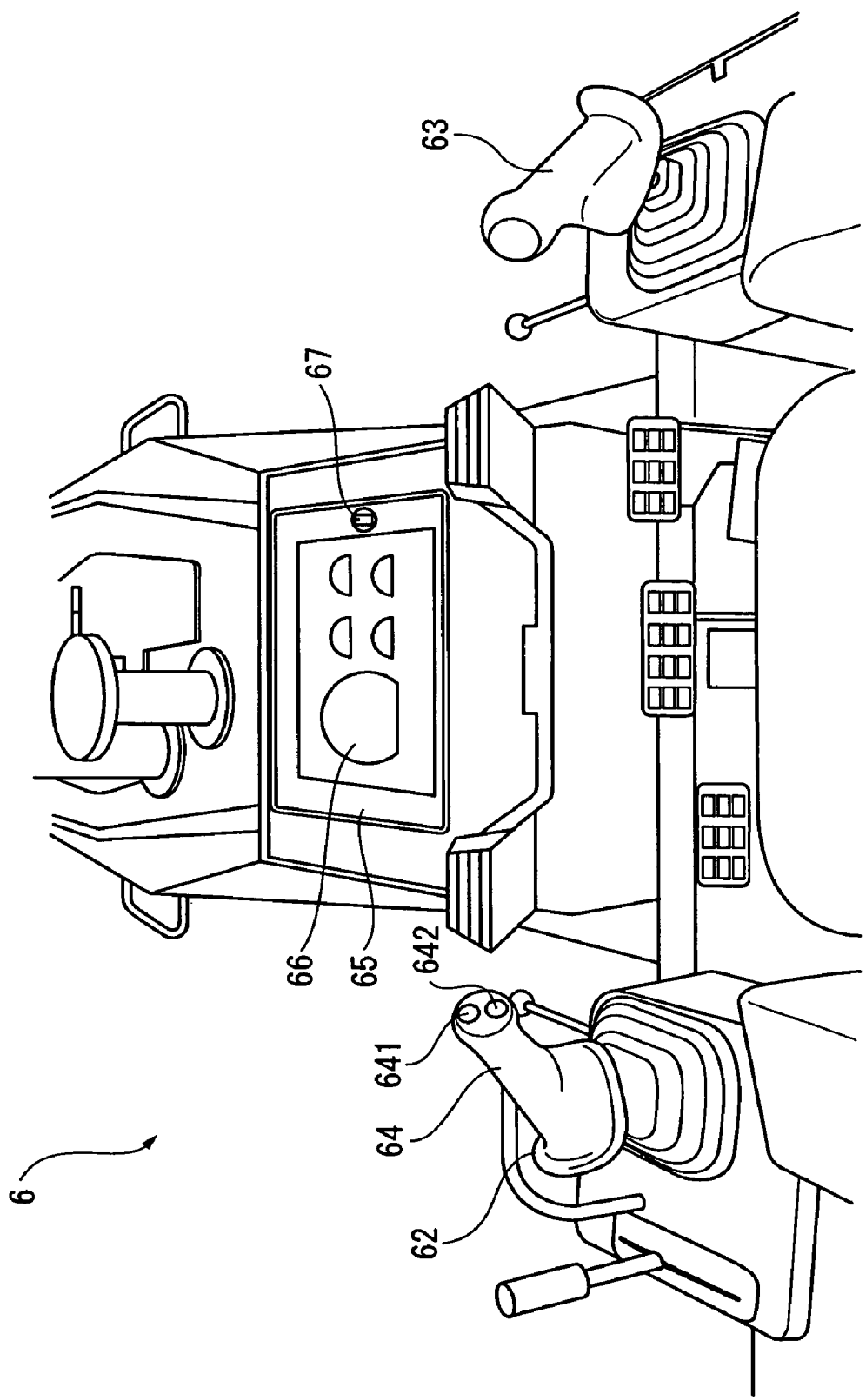
FIG. 2 is a brief perspective view showing the inside of an operation room of the construction machine in the embodiment.

As shown in FIG. 2, the operation room 6 is provided with a traveling lever 62 on the left side of the driver's seat 61 and a bulldozing blade operation lever 63 on the right side of the driver's seat 61 for operating the bulldozing blade 3. The upper portion of the grip 64 of the traveling lever 62 is provided with a shift-up switch 641 and a shift-down switch 642 as speed change operation sections.

The traveling lever 62 is a joystick-like lever. When the traveling lever 62 is operated, an operation signal is output to a below-mentioned controller 74, and the controller 74 then generates a controlling signal based on the operation signal to operate respective parts of the HST device 7, so that the bulldozer 1 travels. Specifically, when the traveling lever 62 is pushed down forward, an operation signal is output to allow the bulldozer 1 to move ahead; when the traveling lever 62 is pushed down rearward, an operation signal is output to allow the bulldozer 1 to move in reverse; when the traveling lever 62 is pushed down leftward, an operation signal is output to allow the bulldozer 1 to steer left; and when the traveling lever 62 is pushed down rightward, an operation signal is output to allow the bulldozer 1 to steer right.

The front of the driver's seat 61 is provided with a monitor panel 65 equipped with meters, switches and the like. The monitor panel 65 is provided with a speed stage display 66 on the left close to the center, and a shift-mode-switching switch 67 on the right.

Figure 3:
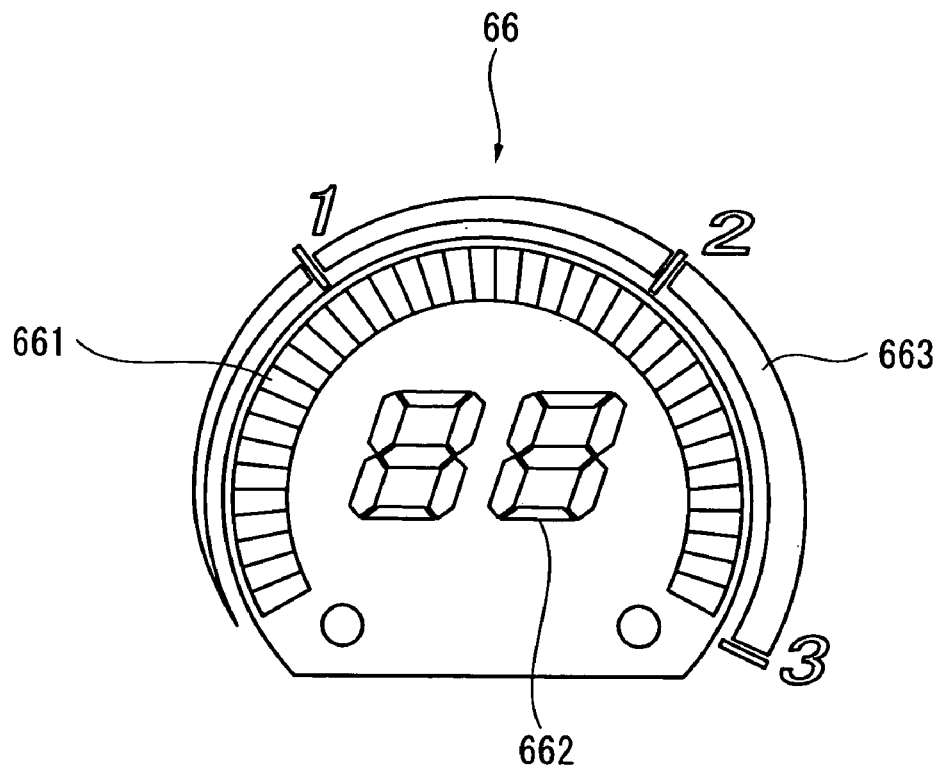
FIG. 3 is a schematic illustration showing the structure of a speed stage display in the embodiment.

The speed stage display 66 is a liquid crystal display and has, as shown in FIG. 3, a continuous speed stage display 661 comprised of a plurality of segments arranged in circular arc, and a shift indicator 662 for displaying a speed stage (i.e. a speed change ratio) by characters. Further, a marking 663 is provided on the circumference of the continuous speed stage display 661. The marking 663 is formed by combining a circular arc expanded gradually from one end to the other end, by which the relation between speed stages in respective mode can be known, and a number indicating the speed stage when in a quick shift mode.

Figure 4:
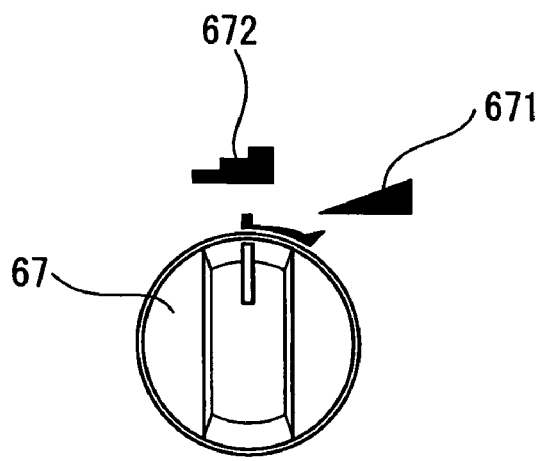
FIG. 4 is a schematic illustration showing the structure of a shift-mode-switching switch in the embodiment.

As shown in FIG. 4, the shift-mode-switching switch 67 is for switching the quick shift mode as a first shift mode and a continuously variable shift mode as a second shift mode. A continuously variable mark 671 indicating the position of the continuously variable shift mode and a step mark 672 indicating the position of the quick shift mode are formed around the shift-mode-switching switch 67 of the monitor panel 65.

Further, the shift-mode-switching switch 67 respectively sends to a controller 74 (as a controlling section) a continuously variable shift mode signal at the continuously variable shift mode position, and a quick shift mode signal at the quick shift mode position. Incidentally, though a rotary switch is used for the shift-mode-switching switch 67 in the present embodiment, the shift-mode-switching switch 67 may also be a see-saw switch, or a push-button switch.

Referring back to FIG. 2, when the shift-up switch 641 is operated, a shift-up signal is sent to the below-mentioned controller 74 as a controlling section of the HST device 7; and when the shift-down switch 642 is operated, a shift-down signal is sent to the controller 74.

The shift-up switch 641 and the shift-down switch 642 are, for example, push-button switches which work in a manner in which when the button is pushed by a finger, the switch becomes "on", so that the signal is sent to the controller 74; and when the finger takes off from the button, the switch becomes "off", so that the signal is not sent to the controller 74.

A see-saw switch also can be used as the shift-up switch 641 and the shift-down switch 642 to accomplish the same function.

[2] Configuration of HST Device 7

The configuration of the HST device 7 will be described below with reference to FIG. 5.

The HST device 7 has an HST pump 71, two traveling drive sections 72 respectively arranged corresponding to the right and the left traveling devices of the crawler device 4, a switching section 73 including four-rows of solenoid valves, a controller 74, and a hydraulic oil tank 75.

(2-1) Configuration of HST Pump 71

The HST pump 71 includes two variable capacity pumps 711, two pump actuators 712, two pump servo valves 713, and four EPC valves 714, the respective variable capacity pumps 711 constituting a closed circuit with the corresponding traveling drive section 72 to supply the pressure oil to the traveling drive section 72.

The variable capacity pump 711 is enabled to change the capacity thereof by continuously changing the tilting angle of a swash plate, and the traveling speed of the bulldozer 1 can be increased by increasing the displacement of the variable capacity pump 711.

The pump actuator 712 is for controlling the displacement of the variable capacity pump 711, or more specifically, the pump actuator 712 changes the displacement by connecting the servo piston, which is driven by the oil pressure, to the end of the swash plate of the variable capacity pump 711, and supplying the pressure oil to the pump actuator 712 from the pilot line so as to change the tilting angle of the swash plate.

The pump servo valve 713 is a 4-port 3-position valve for controlling the quantity of oil fed to the pump actuator 712. By switching the positions, the pump servo valve 713 adjusts the quantity of the hydraulic oil supplied through the pilot line and supplies the hydraulic oil to the pump actuator 712.

The EPC valve 714 controls the position of the pump servo valve 713, and there are two EPC valves 714 provided to the pump servo valve 713. The EPC valve 714 is electrically connected to the controller 74. When an electric signal is output from the controller 74, the solenoid is excited, and the flow passage of the EPC valve 714 is switched, and thereby the position of the pump servo valve 713 is switched.

(2-2) Configuration of Traveling Drive Section 72

The traveling drive sections 72 are respectively arranged corresponding to the right and the left crawler devices 4. Each of the traveling drive sections 72 has a clutch 721, a variable capacity motor 722, a first actuator 723, a second actuator 724, a shuttle valve 725, a relief valve 726, and a speed change switching valve 727.

The clutch 721 is arranged between the rotation shaft of the variable capacity motor 722 and the driving shaft 421 of the driving wheel 42 of the crawler device 4. The clutch 721 is provided for transmitting a rotation force of the variable capacity motor 722 to the driving shaft 421, and the rotation shaft of the variable capacity motor 722 and the driving shaft 421 can be connected and disconnected with an attached actuator 721A.

The variable capacity motor 722 has the rotation shaft thereof (serving as an output shaft) connected to the clutch 721, and an oil pressure feeding source connected to the variable capacity pump 711 through a pipeline A0, so that the variable capacity motor 722 is driven by the pressure oil from the variable capacity pump 711 and serves as a driving source for driving the driving wheel 42 of the crawler device 4. The output rotation speed, torque and the like of the rotation shaft of the variable capacity motor 722 can be changed by changing the tilting angle of the swash plate by three stages.

The first actuator 723 and the second actuator 724 control the output of the variable capacity motor 722. The output shaft of the first actuator 723 is connected to the end of the swash plate of the variable capacity motor 722. To restrict the backward movement amount of the output shaft of the first actuator 723, the output shaft of the second actuator 724 contacts the projecting portion of the output shaft of the first actuator 723.

The angle of the swash plate of the variable capacity motor 722 becomes the largest in a state where the output shaft of the first actuator 723 is most protruded, and the angle of the swash plate of the variable capacity motor 722 becomes the smallest in a state where the output shaft of the first actuator 723 recedes most. The backward movement amount of the output shaft of the first actuator 723 is restricted in a state where the output shaft of the second actuator 724 is protruded, and the swash plate of the variable capacity motor 722 is at an intermediate angle in this state.

The shuttle valve 725 is provided on the way of a pipeline A1, which branches from the pipeline A0 of the variable capacity pump 711 and the variable capacity motor 722 so as to sandwich both an upstream and downstream side of the variable capacity motor 722, for supplying the pressure oil to the first actuator 723 and the second actuator 724. The shuttle valve 725 is a 5-port 3-position valve of which two ports on an input side are respectively connected to the upstream and downstream side of the variable capacity motor 722, and among three ports on an output side, two ports are connected to an input side of the speed change switching valve 727, one port is connected to a drain pipe through the relief valve 726.

Further, the shuttle valve 725 changes the position by self-pressure, and when the pressure oil of the upstream and the downstream sides of the variable capacity motor 722 is balanced, either input will be shut off from the drain pipe in the center position. On the other hand, when the balance of the upstream side and the downstream side is lost, the shuttle valve 725 will change the position according to the pressure of the upstream side and the downstream side, the flow with high pressure will be output to the speed change switching valve 727, and the flow with low pressure will be discharged to the drain pipe through the relief valve 726.

The speed change switching valve 727 is a 5-port 3-position valve for switching position corresponding to a speed changing control signal of the below-mentioned controller 74. One of the two ports of the speed change switching valve 727 on the input side is connected to the output side of the shuttle valve 725, and the other one is connected to the drain pipe. One of the three ports of the speed change switching valve 727 on the output side is connected to an input/output port which moves the piston of the second actuator 724 in the advancing direction of the output shaft, and the other two are respectively connected to an input port which moves the piston of the first actuator 723 in the reversing direction and an output port which moves the piston of the first actuator 723 in the advancing direction.

Incidentally, the port which moves the output shaft of the first actuator 723 in the reversing direction and a port which moves the piston of the second actuator 724 in the reversing direction are connected with each other.

Flow regulating valves 728 are provided inside the speed change switching valve 727. With the flow regulating valves 728, an operation time of the first actuator 723 and second actuator 724, namely the time for switching the angle of the swash plate of the variable capacity motor 722, is adjusted.

Further, three positions of MIN, MID, and MAX are set for the speed change switching valve 727, and when the speed changing control signal from the controller 74 is not input, the position is set to the MAX position. Specifically, each position is respectively set to pressure oil supply conditions as below.

The MAX position is set to a condition that the input pressure oil is supplied to all ports of the first actuator 723 and the second actuator 724. In this position, due to the difference of the pressure receiving area of the pistons in the first actuator 723 and the second actuator 724, both output shafts of the first actuator 723 and second actuator 724 are protruded, and the angle of the swash plate of the variable capacity motor 722 becomes maximum.

The MID position is set to a condition that the port of the first actuator 723 in the advancing direction of the output shaft is connected to the drain pipe, and the input pressure oil is supplied to the other ports. In this position, the output shaft of the second actuator 724 is protruded, the output shaft of the first actuator 723 can only be reversed to an intermediate position, and the angle of the swash plate of the variable capacity motor 722 becomes intermediate.

The MID position is set to a condition that the port of the first actuator 723 in the advancing direction of the output shaft and the port of the second actuator 724 in the advancing direction of the output shaft are connected to the drain pipe, and the input pressure oil is supplied to the other ports. In this position, both the output shaft of the first actuator 723 and the output shaft of second actuator 724 are reversed, and the angle of the swash plate becomes minimum.

(2-3) Configuration of Switching Section 73

The switching section 73 has a fixed capacity pump 73A, and four solenoid valves 731, 732, 733 and 734. The switching section 73 is provided for switching the valves constituting the traveling drive section 72.

Figure 5:
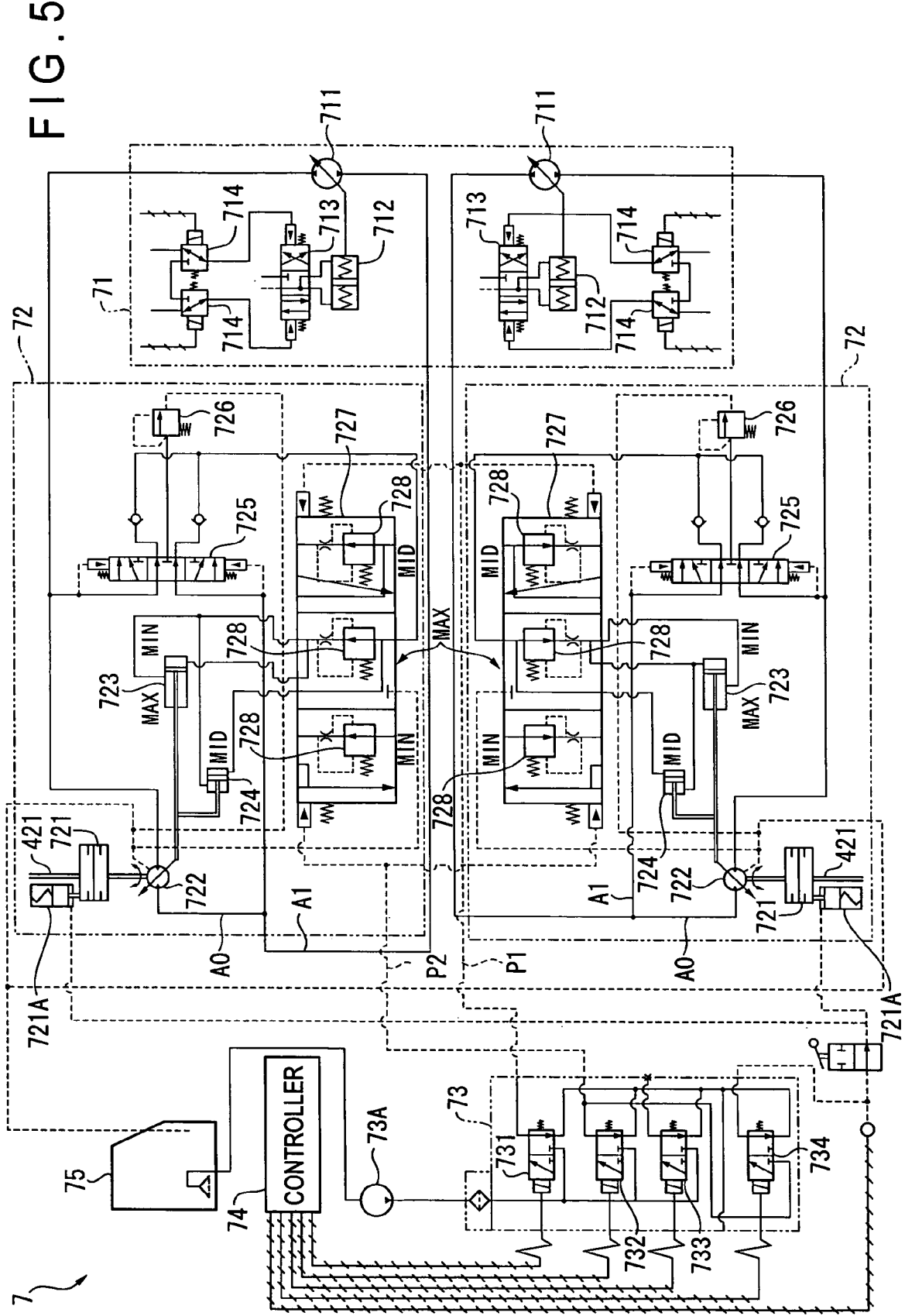
FIG. 5 is a schematic illustration of a hydraulic circuit showing the structure of an HST device in the embodiment.
Figure 6:
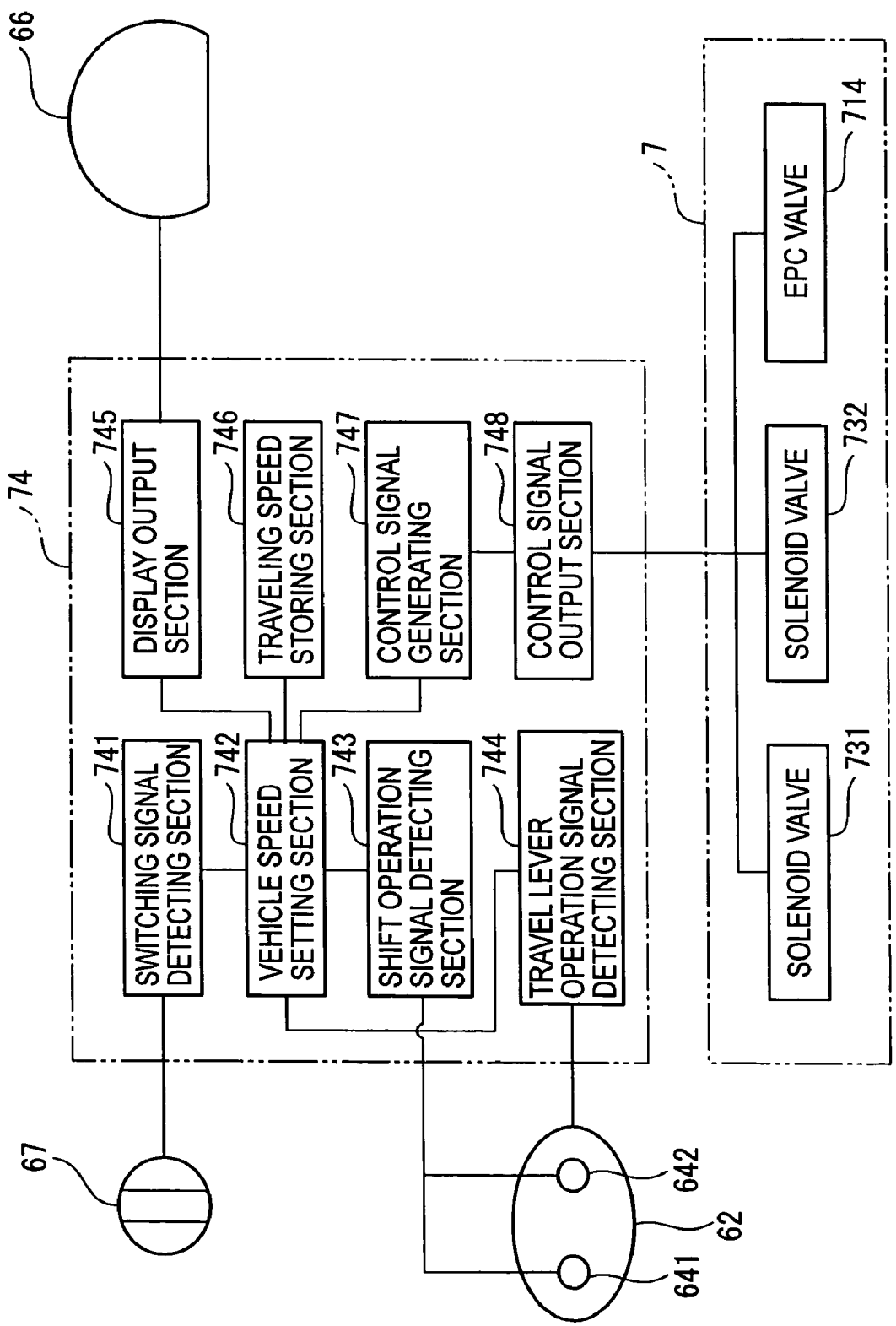
FIG. 6 is a block diagram showing the structure of a controller in the embodiment.

The fixed capacity pump 73A is a pump for generating the pilot pressure of the pilot line indicated by the broken line of FIG. 5. The fixed capacity pump 73A supplies the hydraulic oil as pressure oil to the pilot line from the hydraulic oil tank 75.

The solenoid valve 731 is for switching the swash plate of the variable capacity motor 722 to intermediate angle according to the speed changing control signal from the controller 74. When the solenoid of the solenoid valve 731 is excited, the pilot pressure is supplied to the speed change switching valve 727 through a pilot line P1 to switch the position of the speed change switching valve 727 to the MID position.

The solenoid valve 732 is for switch the swash plate of the variable capacity motor 722 to minimum angle according to the speed changing control signal of the controller 74. When the solenoid of the solenoid valve 732 is excited, the pilot pressure is supplied to the speed change switching valve 727 through a pilot line P2 to switch the position of the speed change switching valve 727 to the MIN position.

The solenoid valve 733 supplies the pilot pressure to a mechanism for a slow brake (not shown). The solenoid valve 734 supplies the pilot pressure to a parking brake, and the actuator 721A of the clutch 721 is driven by the pilot pressure, so that the connection of the clutch 721 is released.

(2-4) Configuration of Controller 74

The controller 74 as a controlling section detects the operation state of the traveling lever 62 provided in the operation room 6, the shift-up switch 641, the shift-down switch 642, and the shift-mode-switching switch 67, generates a controlling signal and outputs the signal to the HST device 7 to control the driving of the HST device 7.

The controller 74 has a switching signal detecting section 741, a vehicle speed setting section 742, a shift operation signal detecting section 743, a travel lever operation signal detecting section 744, a display output section 745, a traveling speed storing section 746, a control signal generating section 747, and a control signal output section 748.

The switching signal detecting section 741 is for detecting the mode signal from the shift-mode-switching switch 67. The switching signal detecting section 741 detects in what state the signal of Low/High or the signal of On/Off is. The shift-mode-switching switch 67 can be set to, for example, "Low" when in quick shift mode, and "High" when in continuously variable shift mode. The mode signal of the shift-mode-switching switch 67 detected by the switching signal detecting section 741 is output to the vehicle speed setting section 742.

The shift operation signal detecting section 743 detects the operation state of the shift-up switch 641 and the shift-down switch 642 of the traveling lever 62. The shift operation signal detecting section 743 detects the shift operation signal corresponding to the shift mode as below.

The shift operation signal detected by the shift operation signal detecting section 743 is output to the vehicle speed setting section 742.

The travel lever operation signal detecting section 744 is for detecting a lever operation signal of the traveling lever 62. The travel lever operation signal detecting section 744 detects whether or not the traveling lever 62 is in any one of the state of moving ahead, moving in reverse, steering left, and steering right. The lever operation signal detected by the travel lever operation signal detecting section 744 is output to the vehicle speed setting section 742.

The vehicle speed setting section 742 is for setting a target vehicle speed of the bulldozer 1 based on the respective operation signals detected by the switching signal detecting section 741, the shift operation signal detecting section 743, and the travel lever operation signal detecting section 744. Specifically, the vehicle speed setting section 742 sets, based on the input respective operation signals, the vehicle speed referring to the speed stage stored in the traveling speed storing section 746 and the table corresponding to the set traveling speed.

The vehicle speed setting section 742 determines, according to the mode signal detected by the switching signal detecting section 741, the shift operation signal detected by the shift operation signal detecting section 743 in the following manner.

(1) When in Quick Shift Mode

When in quick shift mode, the vehicle speed setting section 742 determines that a speed stage switching is performed each time the switch is pushed. For example, if the shift-up switch 641 is pushed for 0.1 second or longer, the vehicle speed setting section 742 detects that an operation signal for raising the present speed stage by one stage is input. Similarly, if the shift-down switch 642 is pushed for 0.1 second or longer, the vehicle speed setting section 742 detects that an operation signal for dropping the present speed stage by one stage is input.

(2) When in Continuously Variable Shift Mode

When in continuously variable shift mode, the vehicle speed setting section 742 determines that a speed stage switching is performed upon the switch has been pushed. For example, if the shift-up switch 641 is pushed for 0.5 second or longer, the vehicle speed setting section 742 determines that an operation signal for raising the present speed stage by the value corresponding to the time for which the shift-up switch 641 has been pushed is input. Similarly, if the shift-down switch 642 is pushed for 0.5 second or longer, the vehicle speed setting section 742 detects that an operation signal for dropping the present speed stage by the value corresponding to the time for which the shift-down switch 642 has been pushed is input. Incidentally, though the continuously variable shift mode of the present embodiment is set as a fractional multistage digital shift mode having substantially twenty stages as the speed changing is achieved based on the controlling signal from the controller 74, the continuously variable shift mode also may be achieved in analog fashion.

Figure 7:
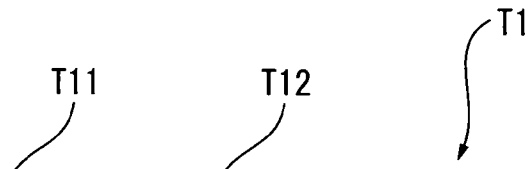
FIG. 7 is a schematic illustration showing the structure of a traveling speed storing section in the embodiment.

As shown in FIG. 7, a table T1 corresponding to the speed stage and the set traveling speed of both the quick shift mode and the continuously variable shift mode is stored in the traveling speed storing section 746. Incidentally, in the present embodiment, the number of the speed stage is set to be three in the quick shift mode and twenty (within the speed changing range of the quick shift mode) in the continuously variable shift mode. Further, in the present embodiment, a plurality of traveling speeds of A, B, C . . . are set for the bulldozer 1, and by means of a reversing speed setting switch (not shown in FIG. 2) provided on the monitor panel 65, a set traveling speed in reversing corresponding to the speed stage can be changed The target vehicle speed set by the vehicle speed setting section 742 is output to the control signal generating section 747.

The display output section 745 is for outputting, based on the respective operation signals input to the vehicle speed setting section 742, a controlling signal which allows the speed stage display 66 to display the shift state. The display output section 745 allows the speed stage display 66 to display the speed stage corresponding to the operation of the shift-up switch 641 and the shift-down switch 642.

Specifically, when in the quick shift mode, the display output section 745 outputs a controlling signal which allows the shift indicator 662 to display a mark corresponding to the speed stage. For example, the mark being displayed in the shift indicator 662 may be, for example, F1 representing the forward first speed, F2 representing the forward second speed, R1 representing the reverse first speed, and R2 representing the reverse second speed.

On the other hand, when in the continuously variable shift mode, the display output section 745 outputs a controlling signal which allows the continuous speed stage display 661 to display segments of the number corresponding the time for which the shift-up switch 641 and the shift-down switch 642 have been pushed.

The control signal generating section 747 generates the speed changing control signal based on the target vehicle speed set by the vehicle speed setting section 742.

In the control signal generating section 747, the speed changing control signal is generated based on various conditions such as travel load, existence (absence) of decelerating operation, in addition to the aforementioned target vehicle speed. However the detail of this part is omitted since it is an already existing technology and should be appropriately designed by those skilled in the art.

The control signal output section 748 is for outputting the speed changing control signal generated by the control signal generating section 747 to the objects to be controlled. In the present embodiment, the control signal output section 748 outputs the speed changing control signal to the solenoid valves 731, 732 for changing the speed of the variable capacity motor 722, and to the EPC valve 714 of the variable capacity pump 711, so that these valves are driven by the speed changing control signal, and the tilting angle of the swash plates of the variable capacity pump 711 and the variable capacity motor 722 are changed, and thereby the speed changing is performed.

[3] Operation of HST Device 7

Figure 8:
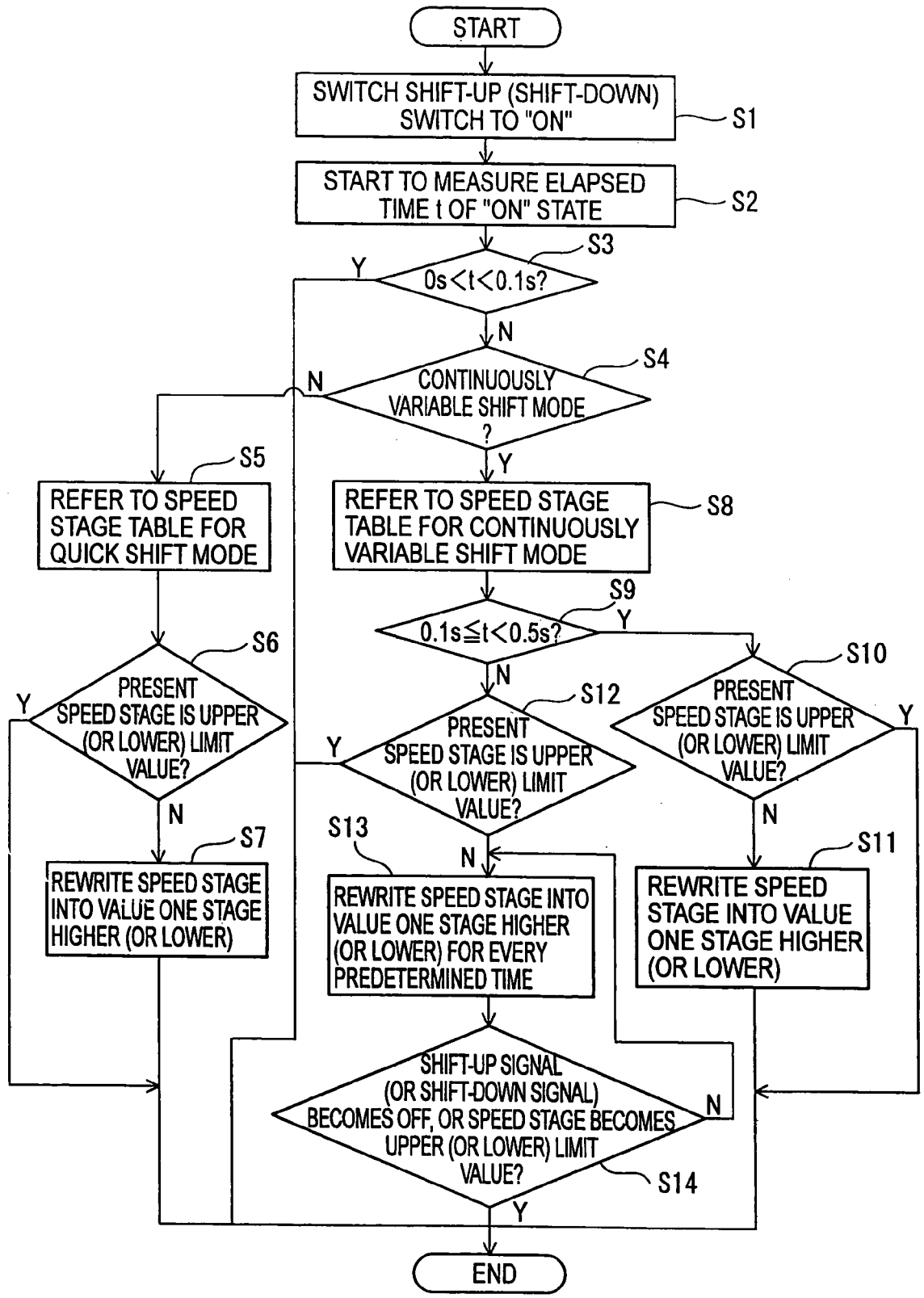
FIG. 8 is a flowchart explaining the function of the embodiment.

The operation of the HST device 7 will be described below with reference to the flowchart of FIG. 8. As described above, the control signal generating section 747 selects either the target vehicle speed set by the vehicle speed setting section 742 or the command speed obtained from the load to generate the speed changing control signal. Hereinafter, the speed setting by the operator will be described as below.

(1) During the operation of the bulldozer 1, when the operator switches the shift-up switch 641 or the shift-down switch 642 to "On" (Step S1), the shift operation signal detecting section 743 of the controller 74 starts to measure the elapsed time t of the "On" state with a built-in timer circuit not shown in FIG. 5 (Step S2). Incidentally, after the "On" state being detected, the speed changing mode is switched by the shift-mode-switching switch 67, and upon the switching is detected by the switching signal detecting section 741, the controller 74 stops the succeeding processing.

(2) The shift operation signal detecting section 743 determines whether the elapsed time t of the "On" state is longer than 0.1 second or not (Step S3), and if the elapsed time t of the "On" state is shorter than 0.1 second, it is determined that the switch is erroneously touched by the operator, and the processing will be stopped.

(3) If the elapsed time t of the "On" state is 0.1 second or longer, the vehicle speed setting section 742 determines whether the mode is the continuously variable shift mode or not (Step S4). If it is determined that the mode is not the continuously variable shift mode, in other words, if it is determined that the mode is the quick shift mode, the vehicle speed setting section 742 refers to a speed stage table T11 for the quick shift mode (refer to FIG. 7) of the traveling speed storing section 746 (Step S5).

(4) Herein, the vehicle speed setting section 742 determines whether the present speed stage is the upper limit value or not when performing the shift-up operation, or determines whether the present speed stage is the lower limit value or not when performing the shift-down operation (Step S6). If the present speed stage is the upper limit value or the lower limit value, since the shift-up operation or the shift-down operation can not be performed any more, the processing will be stopped. On the other hand, if the present speed stage is not the upper limit value or the lower limit value, the vehicle speed setting section 742 rewrites the speed stage of the speed stage table T11 for the quick shift mode into a value one stage high or low (Step S7).

(5) The control signal generating section 747 generates the speed changing control signal based on various conditions such as travel load, existence (absence) of decelerating operation, in addition to the aforementioned target vehicle speed corresponding to the speed stage set by the vehicle speed setting section 742. The generated speed changing control signal is output to the solenoid valves 731, 732 and the EPC valve 714 to change the tilting angle of the swash plates of the variable capacity pump 711 and the variable capacity motor 722.

(6) In the Step S4, if it is determined that the mode is the continuously variable shift mode, the vehicle speed setting section 742 refers to a speed stage table T12 (refer to FIG. 7) for continuously variable shift mode (Step S8). During this period, the shift operation signal detecting section 749 continues to measure time with the aforementioned timer circuit to determine whether the elapsed time t of the "On" state is shorter than 0.5 second or not (Step S9).

(7) Similar to the case of the quick shift mode, when the elapsed time t of the "On" state is shorter than 0.5 second, the vehicle speed setting section 742 determines whether the present speed stage is the upper limit value (or the lower limit value) or not (Step S10), if the present speed stage is determined to be the upper limit value when performing the shift-up operation, or if the present speed stage is determined to be the lower limit value when performing the shift-down operation, the processing will be stopped. If the present speed stage is not the upper limit value (or the lower limit value), the vehicle speed setting section 742 refers to the speed stage table T12 as shown in FIG. 7 for continuously variable shift mode and rewrites the speed stage into a value one stage high (or low) (Step S11). Similar to the case of the quick shift mode, the control signal generating section 747 generates the speed changing control signal based on the rewritten target vehicle speed, outputs the signal to the solenoid valve 731 and the EPC valve 714 via the control signal output section 748 to control the driving of the variable capacity pump 711 and the variable capacity motor 722.

(8) When the elapsed time t of the "On" state is 0.5 second or longer, the vehicle speed setting section 742 determines whether the present speed stage is the upper limit value (or the lower limit value) or not (Step S12), if the present speed stage is determined to be the upper limit value when performing the shift-up operation, or if the present speed stage is determined to be the lower limit value when performing the shift-down operation, the processing will be stopped.

(9) On the other hand, if it is determined that the present speed stage is neither the upper limit value nor the lower limit value, the vehicle speed setting section 742 refers to the speed stage table T12 for continuously variable shift mode, rewrites the speed stage into a value one stage high when performing the shift-up operation for every predetermined time, or rewrites the speed stage into a value one stage low when performing the shift-down operation for every predetermined time (Step S13). The determinations of whether the shift-up signal (or shift-down signal) becomes off or not, whether the speed stage is the upper limit value or not when performing the shift-up operation, and whether the speed stage is the lower limit value or not when performing the shift-down operation are carried out repeatedly until a positive result is determined (Step S14). Incidentally, the vehicle speed setting section 742 outputs the target vehicle speed to the control signal generating section 747 every time the speed stage is rewritten, and the control signal generating section 747 generates the speed changing control signal corresponding to the updated target vehicle speed and outputs the signal to the solenoid valve 731, 732 and the EPC valve 714 via the control signal output section 748 to control the speed changing of the variable capacity pump 711 and the variable capacity motor 722.

[4] Modification of Embodiment

Incidentally, the present invention is not limited to the aforementioned embodiment but includes the modification as described below.

In the aforementioned embodiment, though the speed stage number for the shift-up operation and the shift-down operation of the quick shift mode is three, the present invention is not limited thereto. In other words, the speed stage number for the quick shift mode may be four or five.

In the aforementioned embodiment, though the continuous stepless transmission is described by using the HST as an example, other examples such as a CVT also can be taken as long as it is a continuous stepless transmission. Further, though the continuously variable speed change is described by using the example in which the speed is changed fractionally with twenty stages provided between the maximum speed change ratio and the minimum speed change ratio, the number of the stages is not limited to twenty, and obviously, the arrangement also can be the one in which the speed change ratio keeps changing while the speed change operation section is being operated. Further, though the present invention is described by using a bulldozer as an example, the present invention is not limited to a construction machine but can be applied to other vehicles.

Note that, when implementing the present invention, the detail of construction, the shape and the like can be changed as long as the object of the present invention can be achieved.

INDUSTRIAL APPLICABILITY

The present invention can not only be used for a bulldozer, but also be used for other construction machines such as a power shovel, a wheel loader and the like. Further, the present invention can not only be applied to construction machines such as a bulldozer, but also can be applied to other vehicles.

The invention claimed is:
1. A vehicle comprising:
 a continuous stepless transmission;
 a speed change operation section that switches a speed change ratio of the continuous stepless transmission;
 a shift-mode-switching section that switches a mode of speed change ratio switching by the speed change operation section between:
  a first mode in which the speed change ratio is switched by the speed change operation section in stages among a plurality of preset speed change ratios; and a second mode in which the speed change ratio is switched by the speed change operation section in fractional stages that are more fractionally set in advance than the first mode; and a controlling section that performs a speed changing operation of the continuous stepless transmission at least based on a speed change operation signal indicating an operating state of the speed change operation section and a mode signal indicating the mode in which the shift-mode-switching section is operating.

2. The vehicle according to claim 1, wherein, in the second mode:

the controlling section switches the speed change ratio of the continuous stepless transmission by one stage when an ON state duration of the speed change operation signal is less than a predetermined time; and the controlling section switches the speed change ratio of the continuous stepless transmission by a plurality of stages in accordance with the ON state duration when the ON state duration of the speed change operation signal is equal to the predetermined time or greater than the predetermined time.

3. The vehicle according to claim 1, further comprising:

a monitor panel comprising:

a shift indicator that displays a mark representing a speed stage corresponding to the speed change ratio during the first mode; and a continuous speed stage display provided by a plurality of segments, the continuous speed stage display displaying the number of segments corresponding to the speed stage corresponding to the speed change ratio during the second mode.

4. The vehicle according to claim 1, further comprising:

a traveling lever that selects at least one of forward movement and rearward movement;

wherein the controlling section comprises a vehicle speed setting section that sets a target vehicle speed corresponding to a current speed stage based at least on a travel lever operation signal indicating an operation state of the traveling lever, the speed change operation signal and the mode signal, and wherein the controlling section performs the speed changing operation based on the set target vehicle speed.

5. The vehicle according to claim 4, further comprising:

a reversing speed setting switch;

wherein the controlling section comprises a traveling speed storing section that stores a plurality of set traveling speeds corresponding to the speed stage, and the set traveling speed during a reversing travel can be changed in correspondence with the speed stage by the reversing speed setting switch.

* * * * *